US010852244B2

(12) United States Patent
Kiuchi et al.

(10) Patent No.: US 10,852,244 B2
(45) Date of Patent: Dec. 1, 2020

(54) IMAGE PROCESSING APPARATUS, IMAGE PROCESSING METHOD, AND RECORDING MEDIUM

(71) Applicant: OMRON Corporation, Kyoto (JP)

(72) Inventors: Yutaka Kiuchi, Kusatsu (JP); Yukihiro Komatsu, Kusatsu (JP)

(73) Assignee: OMRON Corporation, Kyoto (JP)

( * ) Notice: Subject to any disclaimer, the term of this patent is extended or adjusted under 35 U.S.C. 154(b) by 198 days.

(21) Appl. No.: 16/132,487

(22) Filed: Sep. 17, 2018

(65) Prior Publication Data

US 2019/0128818 A1    May 2, 2019

(30) Foreign Application Priority Data

Oct. 30, 2017   (JP) ................................. 2017-209294

(51) Int. Cl.
*G01N 21/88*      (2006.01)
*G06T 7/00*       (2017.01)
(Continued)

(52) U.S. Cl.
CPC ....... *G01N 21/8851* (2013.01); *G01B 11/046* (2013.01); *G05B 19/4183* (2013.01);
(Continued)

(58) Field of Classification Search
CPC ................................................ G01N 21/8851
(Continued)

(56) References Cited

U.S. PATENT DOCUMENTS

| 2009/0237669 A1* | 9/2009 | Hariyama | ............ G01B 11/022 |
| | | | 356/445 |
| 2014/0226004 A1* | 8/2014 | Son | ........................ G06T 7/0004 |
| | | | 348/92 |

(Continued)

FOREIGN PATENT DOCUMENTS

| JP | H08334478 | 12/1996 |
| JP | 2010054289 | 3/2010 |

(Continued)

OTHER PUBLICATIONS

Jeffrey N. Murphy, et al., "Automated Defect and Correlation Length Analysis of Block Copolymer Thin Film Nanopatterns," PLOS One, vol. 10, No. 7, Jul. 24, 2015, pp. 1-32.
"Search Report of Europe Counterpart Application", dated Feb. 15, 2019, p. 1-p. 11.

*Primary Examiner* — Tarifur R Chowdhury
*Assistant Examiner* — Omar H Nixon
(74) *Attorney, Agent, or Firm* — JCIPRNET

(57) ABSTRACT

An image processing apparatus, an image processing method and a recording medium capable of detecting a plurality of breaks in a coating material and an inclined break of the coating material are provided. The image processing apparatus includes a grouping unit for extracting coating areas representing a coating material from an input image acquired by imaging an inspection object linearly coated with the coating material and grouping the coating areas for each sequence of linear parts, a calculation unit for calculating a line width in an orthogonal direction of a linear part for each of the linear parts in a plurality of portions of the coating area including end portions of the linear parts, a break detecting unit for detecting a break in the coating material based on the calculated line widths, and an output unit for outputting an indication representing occurrence of the break when the break is detected.

14 Claims, 13 Drawing Sheets

(51) Int. Cl.
*G06T 7/10* (2017.01)
*G06T 7/13* (2017.01)
*G01B 11/04* (2006.01)
*G05B 19/418* (2006.01)
*G05B 19/05* (2006.01)

(52) U.S. Cl.
CPC ............ *G06T 7/001* (2013.01); *G06T 7/0008* (2013.01); *G06T 7/10* (2017.01); *G06T 7/13* (2017.01); *G01N 2021/8864* (2013.01); *G01N 2021/8887* (2013.01); *G05B 19/05* (2013.01); *G06T 2207/30172* (2013.01)

(58) Field of Classification Search
USPC ....................................... 356/237.2
See application file for complete search history.

(56) References Cited

U.S. PATENT DOCUMENTS

2016/0168396 A1* 6/2016 Letocart .................. C09D 5/24
428/210
2016/0343122 A1* 11/2016 Jing ....................... H04N 5/372

FOREIGN PATENT DOCUMENTS

| | | |
|---|---|---|
| JP | 2011095090 | 5/2011 |
| JP | 2012237681 | 12/2012 |
| JP | 2015132536 | 7/2015 |

\* cited by examiner (Input image)

(Binarized image)

(Grouping result)

IMAGE PROCESSING APPARATUS, IMAGE PROCESSING METHOD, AND RECORDING MEDIUM

CROSS-REFERENCE TO RELATED APPLICATION

This application claims the priority benefit of Japan application serial no. 2017-209294, filed on Oct. 30, 2017. The entirety of the above-mentioned patent application is hereby incorporated by reference herein and made a part of this specification.

BACKGROUND

Technical Field

The present disclosure relates to a technology for detecting a break in a coating material with which an inspection object is coated.

Description of Related Art

In the field of factory automation (FA), technologies for automatically inspecting an inspection object such as a workpiece are widely used. As one of automatic inspections, there are technologies for inspecting whether or not a workpiece is coated with a coating material such as a sealing material as is intended. Through the inspection, whether or not a sealing material is broken, whether or not a width of a sealing material is appropriate, whether or not intended places are coated with the sealing material, and the like are detected.

Relating to a technology for detecting a break in a coating material, Japanese Patent Application Laid-Open No. 2015-132536 (Patent Document 1) discloses an inspection device "capable of performing an inspection on a coating state of a sealing material using image processing with high efficiency". The inspection device receives settings of first and second points for an image representing the sealing material. Thereafter, the inspection device determines the presence/absence of a break in the sealing material based on whether or not the second point can be reached by tracking the sealing material from the first point.

As another example, Japanese Patent Application Laid-Open No. 2010-054289 (Patent Document 2) discloses an inspection device "capable of determining the appropriateness/inappropriateness of a path of a linear pattern using a simple method with a high accuracy and reliably detecting a defect when there is a defect such as a break, a bonding defect, or the like." The inspection device receives settings of first and second virtual lines such that the virtual lines traverse a coating material in an image. Thereafter, the inspection device performs outline tracking from edge points on the first virtual line and determines the presence/absence of a break in the sealing material based on whether the first virtual line or the second virtual line can be reached as results of tracking.

As another example, Japanese Patent Application Laid-Open No. H08-334478 (Patent Document 3) discloses a sealing inspection system for "inspecting a coating state of a sealing material using a state in an image." In the sealing inspection system, two edge points are retrieved from inspection points set in advance in a coating material in an image and a distance between the two edge points is detected as a width of the sealing material.

PATENT DOCUMENTS

The inspection device disclosed in Patent Document 1, as described above, tracks a sealing material from the first point set in advance and determines whether or not a sealing material is broken on the basis whether or not the second point can be reached by tracking the sealing material from the first point set in advance. For this reason, while the inspection device can detect whether or not a sealing material is divided, it cannot detect how the sealing material is broken. For example, when a coating material is divided into three or more parts, the inspection device cannot detect that the coating material is divided into three or more parts.

The inspection device disclosed in Patent Document 2, as described above, performs outline tracking from edge points on a first virtual line set in advance and determines the presence/absence of a break in a sealing material based on whether or not the first virtual line or the second virtual line can be arrived at as results of tracking. For this reason, while the inspection device can detect whether or not a sealing material is divided, it cannot detect how the sealing material is broken. For example, when a coating material is divided into three or more parts, the inspection device cannot detect that the coating material is divided into three or more parts.

The sealing inspection system disclosed in Patent Document 3, as described above, retrieves two edge points from inspection points set in advance and detects a distance between the two edge points as a width of the sealing material. The sealing inspection system can detect that a sealing material is divided into a plurality of parts based on a width of the coating material detected for each inspection point. However, the sealing inspection system retrieves two edge points for each inspection point and accordingly, cannot detect an inclined break representing that a linearly-coated sealing material is diagonally broken with respect to the direction of a line.

As above, the inspection methods disclosed in Patent Documents 1 to 3 described above cannot detect both a plurality of breaks in a coating material and an inclined break of a coating material.

SUMMARY

In one example of the disclosure, an image processing apparatus includes a grouping unit that is used for extracting coating areas representing a coating material from an input image acquired by imaging an inspection object linearly coated with the coating material and grouping the coating areas for each sequence of linear parts, a calculation unit that is used for calculating a line width in an orthogonal direction of a linear part for each of the linear parts in a plurality of portions of the coating area including end portions of the linear parts, a break detecting unit that is used for detecting a break in the coating material based on the line widths calculated in the plurality of portions, and an output unit that is used for outputting an indication representing occurrence of a break when the break is detected.

In another example of the disclosure, an image processing method includes extracting coating areas representing a coating material from an input image acquired by imaging an inspection object linearly coated with the coating material and grouping the coating areas for each sequence of linear parts, calculating a line width in an orthogonal direction of the linear part for each of the linear parts in a plurality of portions of the coating area including end portions of the linear parts, detecting a break in the coating material based on the line widths calculated in the plurality of portions, and outputting an indication representing occurrence of the break when the break is detected.

In another example of the disclosure, a non-transitory computer readable recording medium recording an image processing program causes the computer to execute extracting coating areas representing a coating material from an input image acquired by imaging an inspection object linearly coated with the coating material and grouping the coating areas for each sequence of linear parts, calculating a line width in an orthogonal direction of the linear part for each of the linear parts in a plurality of portions of the coating area including end portions of the linear parts, detecting a break in the coating material based on the line widths calculated in the plurality of portions, and outputting an indication representing occurrence of the break when the break is detected.

DESCRIPTION OF THE EMBODIMENTS

Figure 1:
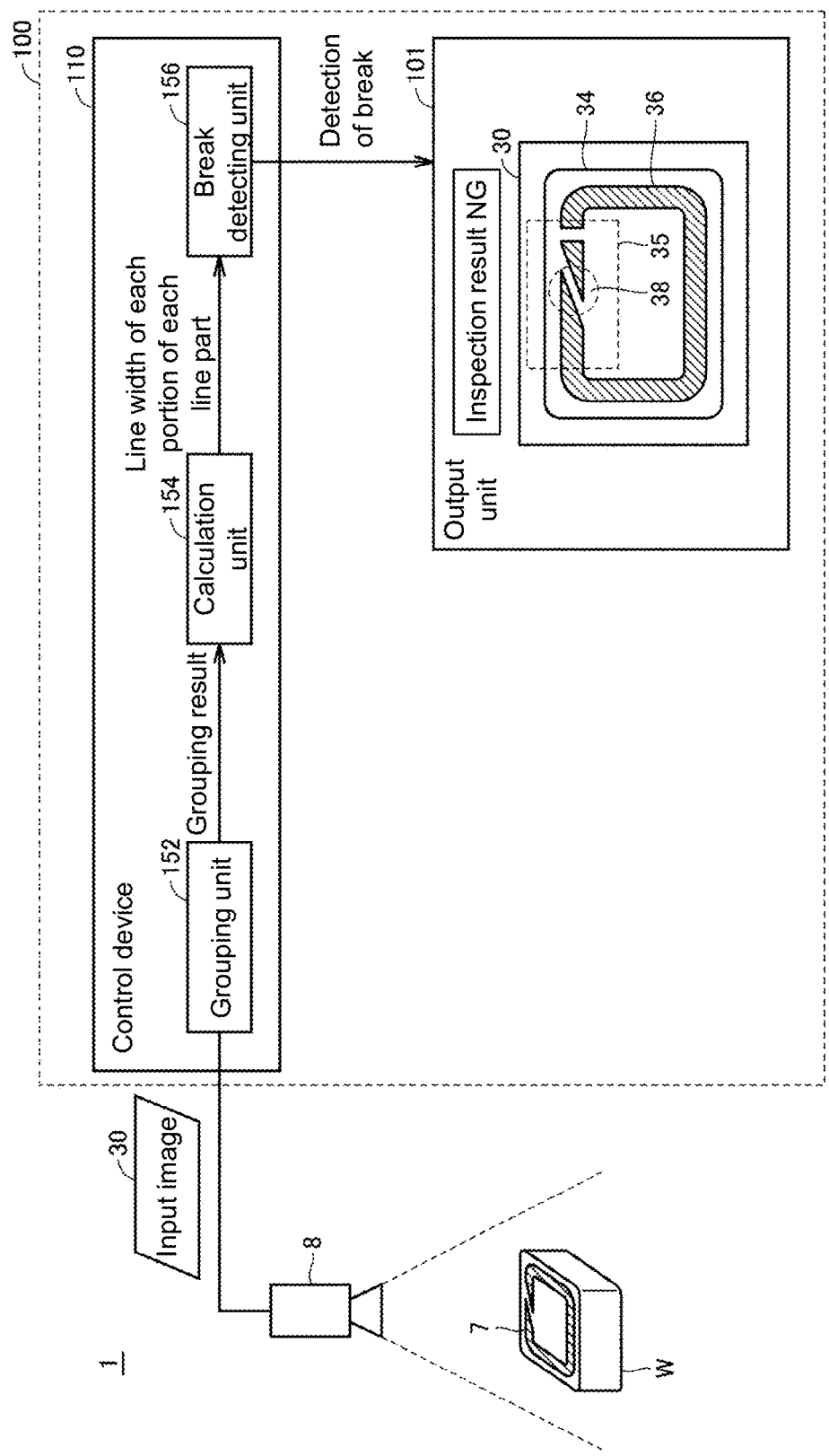
FIG. 1 is a conceptual diagram schematically illustrating an image processing system according to an embodiment.

For solving the problems described above, the present disclosure provides a technology capable of detecting both a break in a plurality of parts in a coating material and an inclined break of a coating material.

According to the disclosure, by calculating line widths in a plurality of portions of the coating area for each sequence of linear parts that are grouped, the image processing apparatus can detect both a plurality of breaks in a coating material and an inclined break of the coating material.

In another example of the disclosure, the output unit displays the input image and displays a portion in which the break has occurred on the input image in an emphasized manner compared with other portions.

According to the disclosure, a user can perceive a portion in which a break has occurred at a glance.

In another example, the emphasized displaying includes displaying a straight line along the break.

According to the disclosure, a user can easily perceive a direction in which a break has occurred.

In another example of the disclosure, the output unit further displays the number of groups into which the coating area is grouped by the grouping unit as the number of breaks of the coating material.

According to the disclosure, the user can easily perceive the number of breaks of the coating material.

In another example of the disclosure, the calculation unit sets straight lines in a plurality of portions of a predetermined reference path such that the straight lines are orthogonal to the reference path representing positions at which the coating material is to be shown in an image and detects two edge points presented on each of the set straight lines for each of the linear parts and calculates a distance between the two edge points as the line width.

According to the disclosure, an edge point is necessarily presented on a straight line set to be orthogonal to the coating area representing the coating material, and accordingly, the image processing apparatus can accurately calculate the line width.

In another example of the present disclosure, when a plurality of line widths are calculated for one of the straight lines set in the plurality of portions, the break detecting unit detects the break.

According to the disclosure, line widths are calculated at a plurality of portions of the coating area for each sequence of linear parts that are grouped, and accordingly, the image processing apparatus can easily detect an inclined break of the coating material.

According to the disclosure, by calculating line widths in a plurality of portions of the coating area for each sequence of linear parts that are grouped, the image processing method can detect both a plurality of breaks in a coating material and an inclined break of the coating material.

According to the disclosure, by calculating line widths in a plurality of portions of the coating area for each sequence of linear parts that are grouped, the image processing program can detect both a plurality of breaks in a coating material and an inclined break of the coating material.

According to an aspect, both a break in a plurality of parts in a coating material and an inclined break of a coating material can be detected.

Hereinafter, an embodiment of the disclosure will be described with reference to the drawings. In the following description, the same reference signs are assigned to the same components and the same constituent elements. In addition, the names and the functions thereof are the same. Thus, detailed description thereof will not be repeated.

A. Application Example

First, application examples of the disclosure will be described with reference to FIGS. 1 and 2. FIG. 1 is a conceptual diagram schematically illustrating an image processing system 1 according to this embodiment.

The image processing system 1 is, for example, configured of an imaging unit 8 used for imaging an inspection object and an image processing apparatus 100 used for executing predetermined image processing for an image acquired from the imaging unit 8. The imaging unit 8 may be configured as being separated from the image processing apparatus 100 or may be configured integrally with the image processing apparatus 100.

The image processing apparatus 100 includes a control device 110 used for controlling the image processing apparatus 100 and an output unit 101 used for outputting results of an inspection as major components. The control device 110 includes a grouping unit 152, a calculation unit 154, and a break detecting unit 156 as major functional components.

The imaging unit 8 images a workpiece W conveyed on a conveyer and generates an input image representing the workpiece W. The workpiece W is an inspection object and is, for example, a product or a semifinished product. The workpiece W is coated with a coating material 7. The coating material 7 is, for example, an adhesive agent such as a sealing material. The imaging unit 8 sequentially outputs generated input images 30 to the grouping unit 152 of the control device 110.

Figure 2:
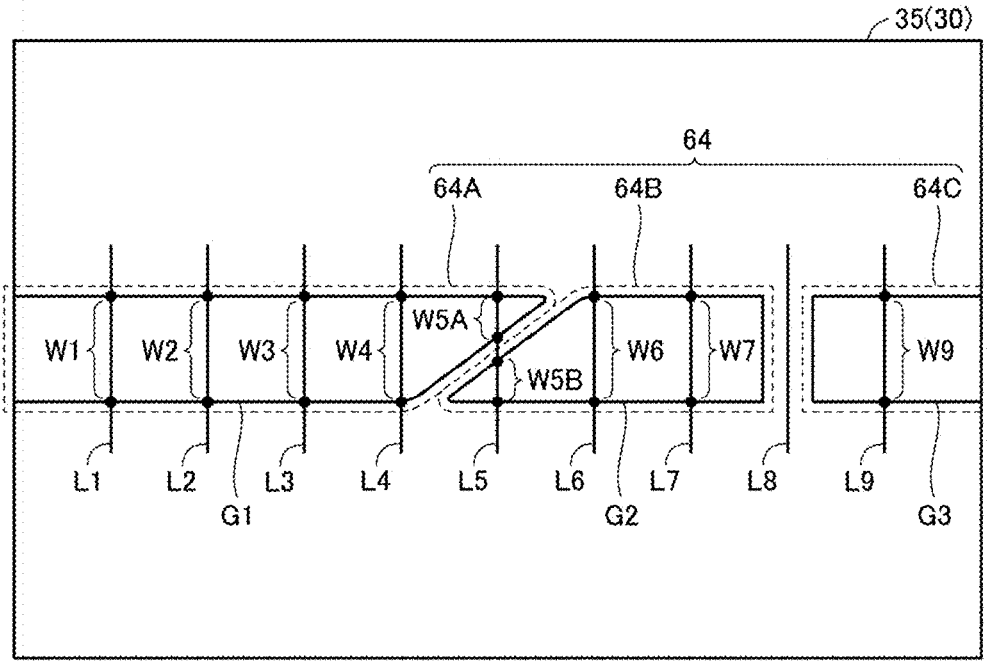
FIG. 2 is a diagram illustrating functions of an image processing apparatus according to an embodiment.

FIG. 2 is a diagram illustrating functions of the image processing apparatus 100. In FIG. 2, a part of an input image 30 is illustrated as an input image 35.

The grouping unit 152 extracts coating areas 64 representing coating material 7 from the input image 35 and groups the coating areas 64 for each sequence of linear parts. In the example illustrated in FIG. 2, a linear part 64A of the coating area 64 is grouped as a group G1. Similarly, a linear part 64B of the coating area 64 is grouped as a group G2. Similarly, a linear part 64C of the coating area 64 is grouped as a group G3. Results of the grouping using the grouping unit 152 are output to the calculation unit 154. As an example, results of grouping include identification information used for identifying the groups G1 to G3, coordinate values of the groups G1 to G3 inside the image, and the like.

The calculation unit 154 calculates a line width (thickness) of each of the linear parts 64A to 64C in an orthogonal direction of the linear part at a plurality of portions in the coating area 64 including end portions of the linear parts 64A to 64C. An end portion described here does not need to be a tip end of each of the linear parts 64A to 64C and may represent a portion within a predetermined distance (a predetermined number of pixels) from the tip end of each of the linear parts 64A to 64C. Details of a method of calculating a line width will be described later.

In the example illustrated in FIG. 2, the calculation unit 154 calculates line widths on reference straight lines L1 to L9. More specifically, for the linear part 64A, the calculation unit 154 calculates line widths W1 to W4 and W5A on reference straight lines L1 to L5. For the linear part 64B, the calculation unit 154 calculates line widths W5B, W6, and W7 on reference straight lines L5 to L7. For the linear part 64C, the calculation unit 154 calculates a line width W9 on a reference straight line L9. The calculated line widths W1 to W4, W5A, W5B, W6, W7, and W9 are output to the break detecting unit 156.

The break detecting unit 156 detects a break in the coating material based on the line widths W1 to W4, W5A, W5B, W6, W7, and W9 calculated for the linear parts 64A to 64C. While details will be described later, the break detecting unit 156, for example, can detect an inclined break representing that a linear coating material is broken by being inclined with respect to a tangential direction of the coating material based on calculation of a plurality of line widths for one of the reference straight lines L1 to L9. In the example illustrated in FIG. 2, since a plurality of line widths W5A and W5B are detected for one reference straight line L5, the break detecting unit 156 detects an inclined break on the reference straight line L5.

The output unit 101 is a unit that is used for outputting results of an inspection. For example, the output unit 101 may be a display unit 102 (see FIG. 3) to be described later, a speaker that outputs sound, an indicator, or any other output device. When a break is detected by the break detecting unit 156, the output unit 101 outputs an indication representing an occurrence of a break. In the example illustrated in FIG. 1, a circle 38 is attached to a place at which a break has occurred.

By calculating a line width for each grouped linear part, even when the coating material is divided into three or more parts, the image processing apparatus 100 can detect a break in the coating material.

B. Configuration of Image Processing System 1

Figure 3:
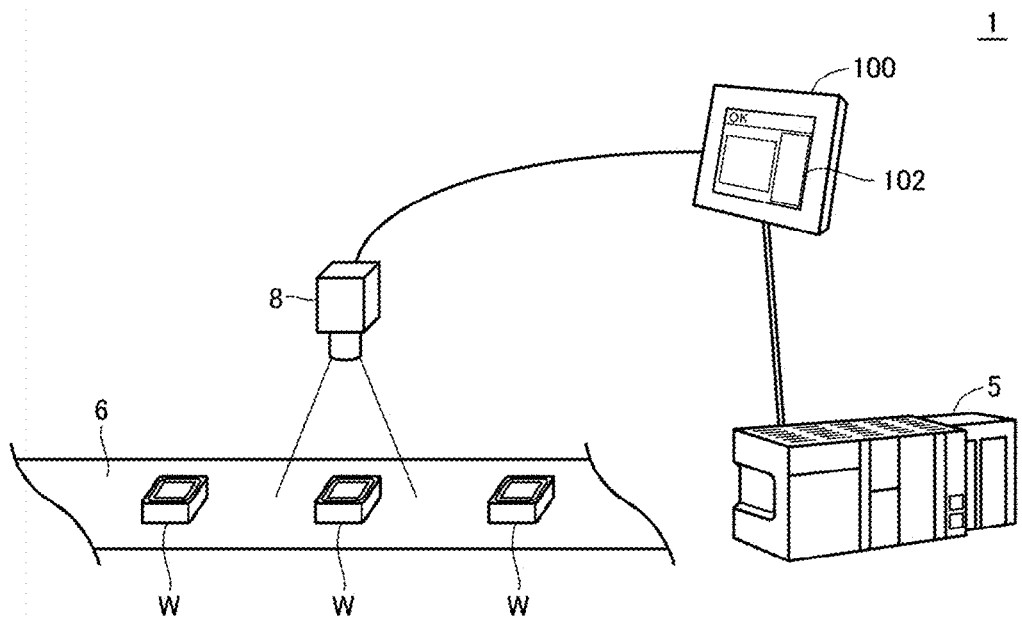
FIG. 3 is a diagram illustrating one example of the entire configuration of an image processing system according to an embodiment.

The entire configuration of the image processing system 1 will be described with reference to FIG. 3. FIG. 3 is a diagram illustrating one example of the entire configuration of the image processing system 1.

The image processing system 1 includes an image processing apparatus 100 that is also referred to as a visual sensor, a programmable logic controller (PLC) 5 that can communicate with the image processing apparatus 100, and an imaging unit 8 (an image acquiring unit) that is connected to the image processing apparatus 100 as major components.

The PLC 5 executes control of a conveying mechanism 6 such as a conveyer by cooperating with the image processing apparatus 100. As an example, in addition to an optical system such as a lens, the imaging unit 8 is configured to include imaging devices, which are partitioned into a plurality of pixels, such as coupled charged devices (CCD) or complementary metal oxide semiconductor (CMOS) sensors. The imaging unit 8 sequentially images workpieces W conveyed by the conveying mechanism 6. Input images acquired through imaging using the imaging unit 8 are transmitted to the image processing apparatus 100.

By executing a predetermined inspection program, the image processing apparatus 100 inspects whether or not an inspection object is coated with a coating material as is intended. For example, the image processing apparatus 100 may inspect whether or not a coating material is broken, whether or not a coating width of a coating material is appropriate, whether or not an intended place is coated with a coating material, and the like. Results of the inspection performed by the image processing apparatus 100 are displayed on the display unit 102.

C. Configuration of Image Processing Apparatus 100

Figure 4:
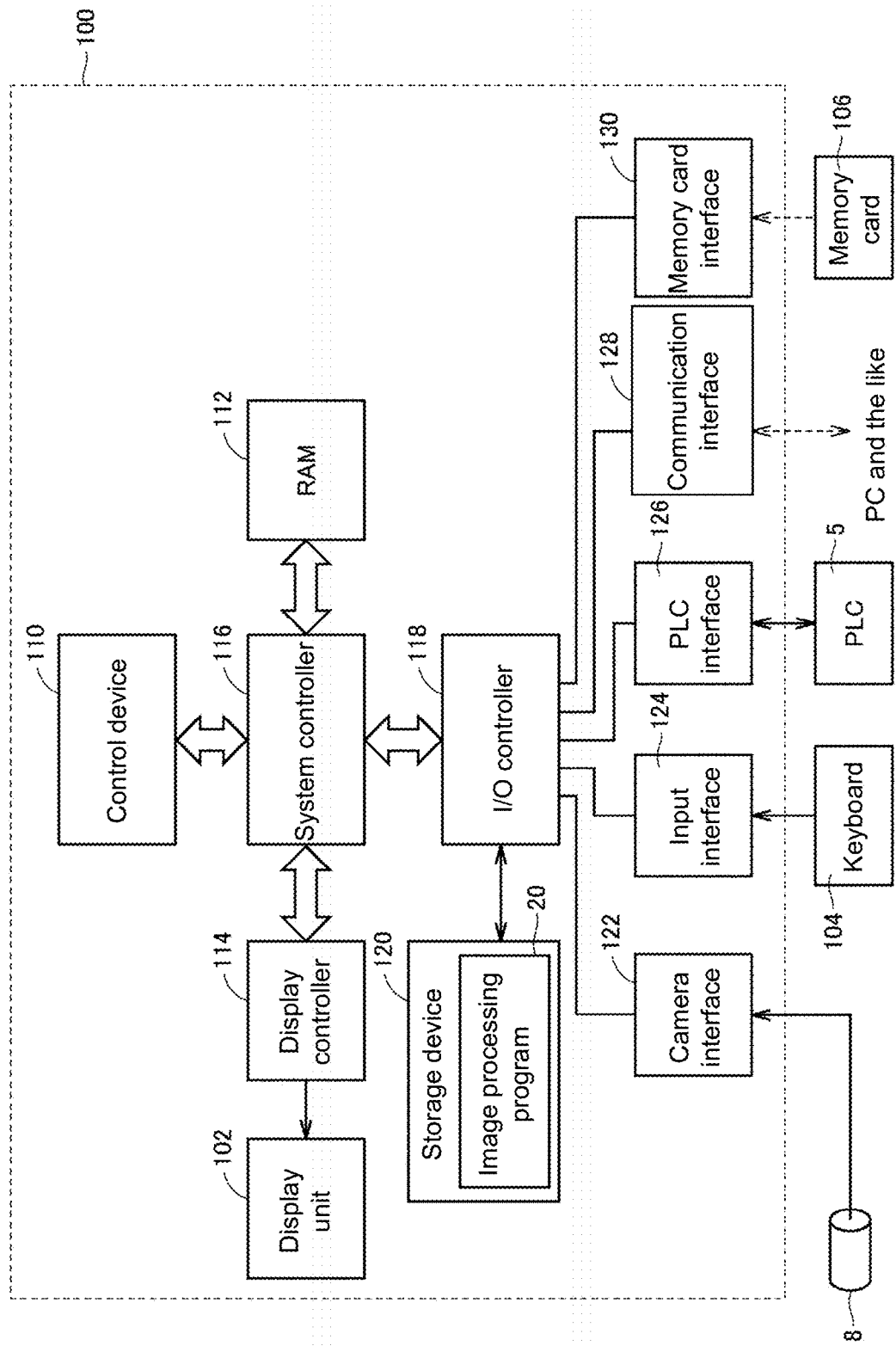
FIG. 4 is a schematic diagram illustrating one example of the hardware configuration of an image processing apparatus according to an embodiment.

The hardware configuration of the image processing apparatus 100 illustrated in FIG. 1 will be described with reference to FIG. 4. FIG. 4 is a schematic diagram illustrating one example of the hardware configuration of the image processing apparatus 100.

The image processing apparatus 100, typically, has a structure according to a general-purpose computer architecture, and, by executing a program installed in advance using a processor, various image processes described with reference to FIG. 1 are realized.

More specifically, the image processing apparatus 100 includes a control device 110 such as a central processing unit (CPU) or a micro-processing unit (MPU), a random access memory (RAM) 112, a display controller 114, a system controller 116, an input/output (I/O) controller 118, a storage device 120, a camera interface 122, an input interface 124, a PLC interface 126, a communication interface 128, and a memory card interface 130. Such units are interconnected to enable data communication using the system controller 116 as a center.

The control device 110 exchanges a program (code) and the like with the system controller 116 and executes them in a predetermined order, thereby realizing a target arithmetic operation process. The system controller 116 is connected to the control device 110, the RAM 112, the display controller 114, and the I/O controller 118 through a bus, performs exchange of data and the like with each unit, and is responsible for the overall process of the image processing apparatus 100.

The RAM 112 is, typically a volatile memory such as a dynamic random access memory (DRAM) and stores a program read from the storage device 120, an input image acquired by the imaging unit 8, results of the processing for the input image, workpiece data, and the like.

The display controller 114 is connected to the display unit 102 and outputs a signal for displaying various kinds of information to the display unit 102 in accordance with an internal command supplied from the system controller 116. The display unit 102, for example, includes a liquid crystal display, an organic electro luminescence (EL) display, an organic EL, or the like. The display unit 102, as illustrated in FIG. 4, may be integrally configured with the image processing apparatus 100 or may be configured separately from the image processing apparatus 100.

The I/O controller 118 controls data exchange with a recording medium or an external device connected to the image processing apparatus 100. More specifically, the I/O controller 118 is connected to the storage device 120, the camera interface 122, the input interface 124, the PLC interface 126, the communication interface 128, and the memory card interface 130.

The storage device 120 is, typically, a nonvolatile magnetic storage device, and various setting values and the like are stored therein in addition to an image processing program 20 executed by the control device 110. In addition, an input image acquired from the imaging unit 8 is stored in the storage device 120. Instead of the storage device 120, a semiconductor memory device such as a flash memory or an optical memory device such as a digital versatile disk random access memory (DVD-RAM) may be employed.

The camera interface 122 corresponds to an input unit that receives image data generated by imaging a workpiece W (inspection object) and relays data transmission between the control device 110 and the imaging unit 8. More specifically, the camera interface 122 can be connected to one or more imaging units 8, an imaging instruction being output from the control device 110 to the imaging units 8 through the camera interface 122. Accordingly, the imaging unit 8 images a subject and outputs a generated image to the control device 110 through the camera interface 122.

The input interface 124 relays data transmission between the control device 110 and input devices such as a keyboard 104, a mouse, a touch panel, and a dedicated console. In other words, the input interface 124 accepts an operation instruction given by a user operating an input device.

The PLC interface 126 relays data transmission between the PLC 5 and the control device 110. More specifically, the PLC interface 126 transmits information relating to the state of a production line, information relating to a workpiece W, and the like controlled by the PLC 5 to the control device 110.

The communication interface 128 relays data transmission between the control device 110 and another personal computer, a server apparatus, or the like not illustrated in the drawings. The communication interface 128 is, typically, configured using Ethernet (registered trademark), a universal serial bus (USB), or the like. Instead of a type in which a program stored in a memory card 106 is installed in the image processing apparatus 100, a program downloaded into a transfer server or the like through the communication interface 128 may be installed in the image processing apparatus 100. For example, the communication interface 128 may receive a signal indicating the state of the imaging unit 8 from the imaging unit 8, the PLC 5, or the like. The signal indicates whether or not the imaging unit 8 is performing imaging.

The memory card interface 130 relays data transmission between the control device 110 and the memory card 106 serving as a recording medium. In other words, in the memory card 106, an image processing program 20 and the like executed by the image processing apparatus 100 is distributed and stored, and the memory card interface 130 reads the image processing program 20 from the memory card 106. In addition, in response to an internal command of the control device 110, the memory card interface 130 writes a camera image acquired by the imaging unit 8 and/or results of the process performed by the image processing apparatus 100, and the like in the memory card 106. The memory card 106 is configured using a general semiconductor memory device such as a secure digital (SD) card, a magnetic recording medium such as a flexible disk, an optical recording medium such as a compact disk read only memory (CD-ROM), or the like.

When a computer having a structure according to the general computer architecture as described above is used, in addition to the applications used for providing functions according to this embodiment, an operating system (OS) used for providing basic functions of the computer may be installed. In such a case, the image processing program according to this embodiment may execute a process of calling necessary modules in a predetermined order and/or at a predetermined timing among programs modules provided as a part of the OS. In other words, the program according to this embodiment may not include the modules as described above, and there are also cases in which processes are executed by cooperation with the OS. Accordingly, the image processing program according to this embodiment may have a form not including some of such modules.

In addition, the image processing program according to this embodiment may be embedded into a part of another program. Also in such a case, the program does not need to include modules included in the other program in which the program is embedded, and the process may be executed by cooperation with the other program. In other words, the image processing program according to this embodiment may have a form of being embedded into such another program.

In addition, alternatively, some or all of the functions provided by executing the image processing program may be embedded as a dedicated hardware circuit.

D. Inspection Flow

An inspection flow using the image processing apparatus 100 will be described with reference to FIGS. 5 to 18. The inspection flow using the image processing apparatus 100 can be roughly divided into a setting process and an inspection process. The setting process is a process executed before the inspection process and is performing setting of parameters of various kinds of image processing executed in the inspection process. In the inspection process, the image processing apparatus 100 executes an inspection process for the coating quality of a coating material in accordance with various parameters set in the setting process.

The setting process and the inspection process are realized by the control device 110 of the image processing apparatus 100 executing a program. In another aspect, a part or the whole of the process may be executed by circuit elements or any other hardware.

Hereinafter, the setting process and the inspection process executed by the image processing apparatus 100 will be sequentially described.

[D1. Setting Process]

Figure 5:
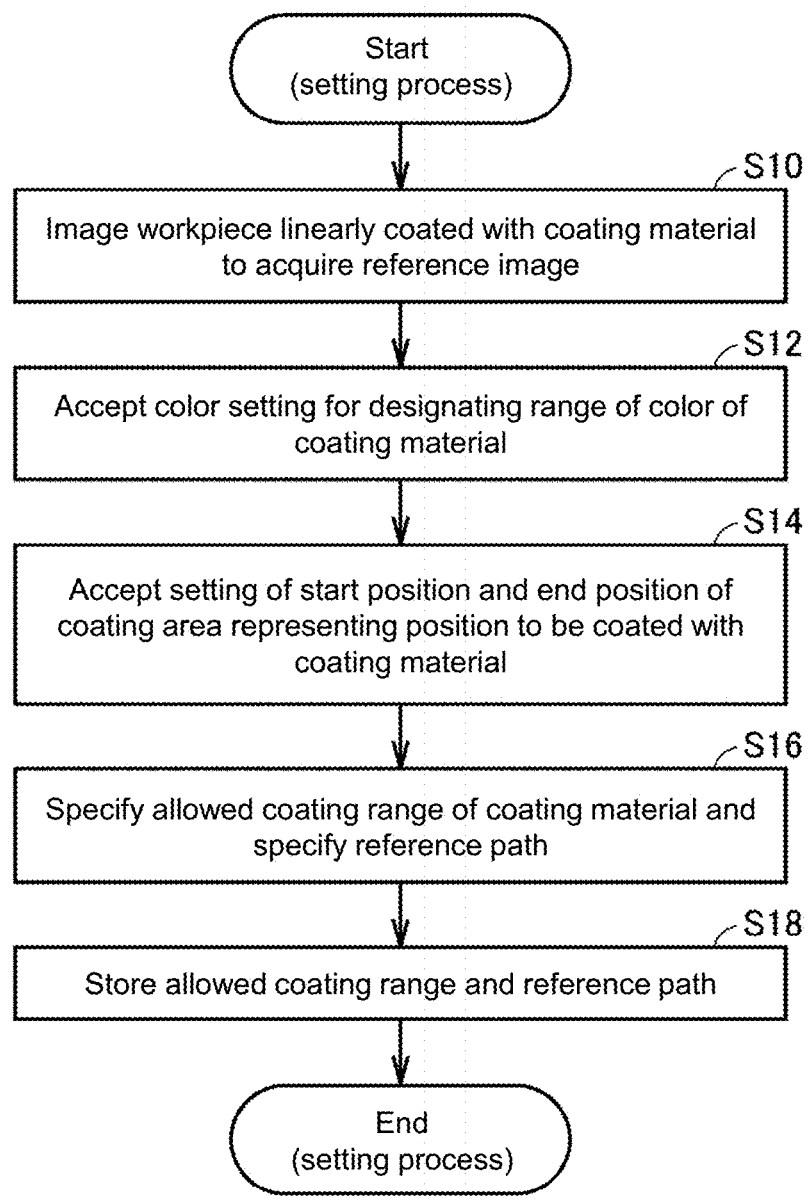
FIG. 5 is a flowchart illustrating a setting process executed by an image processing apparatus according to an embodiment.

First, the setting process executed by the control device 110 of the image processing apparatus 100 will be described with reference to FIGS. 5 to 9. FIG. 5 is a flowchart illustrating the setting process executed by the control device 110.

In Step S10, the control device 110 outputs an imaging instruction to the imaging unit 8 and causes the imaging unit 8 to image a workpiece linearly coated with a coating material. Accordingly, the control device 110 acquires a reference image representing a workpiece coated with a coating material. The reference image acquired in Step S10 is acquired by imaging a workpiece that is normally coated with a coating material and is an image that becomes a model of the coating quality of a coating material.

Figure 6:
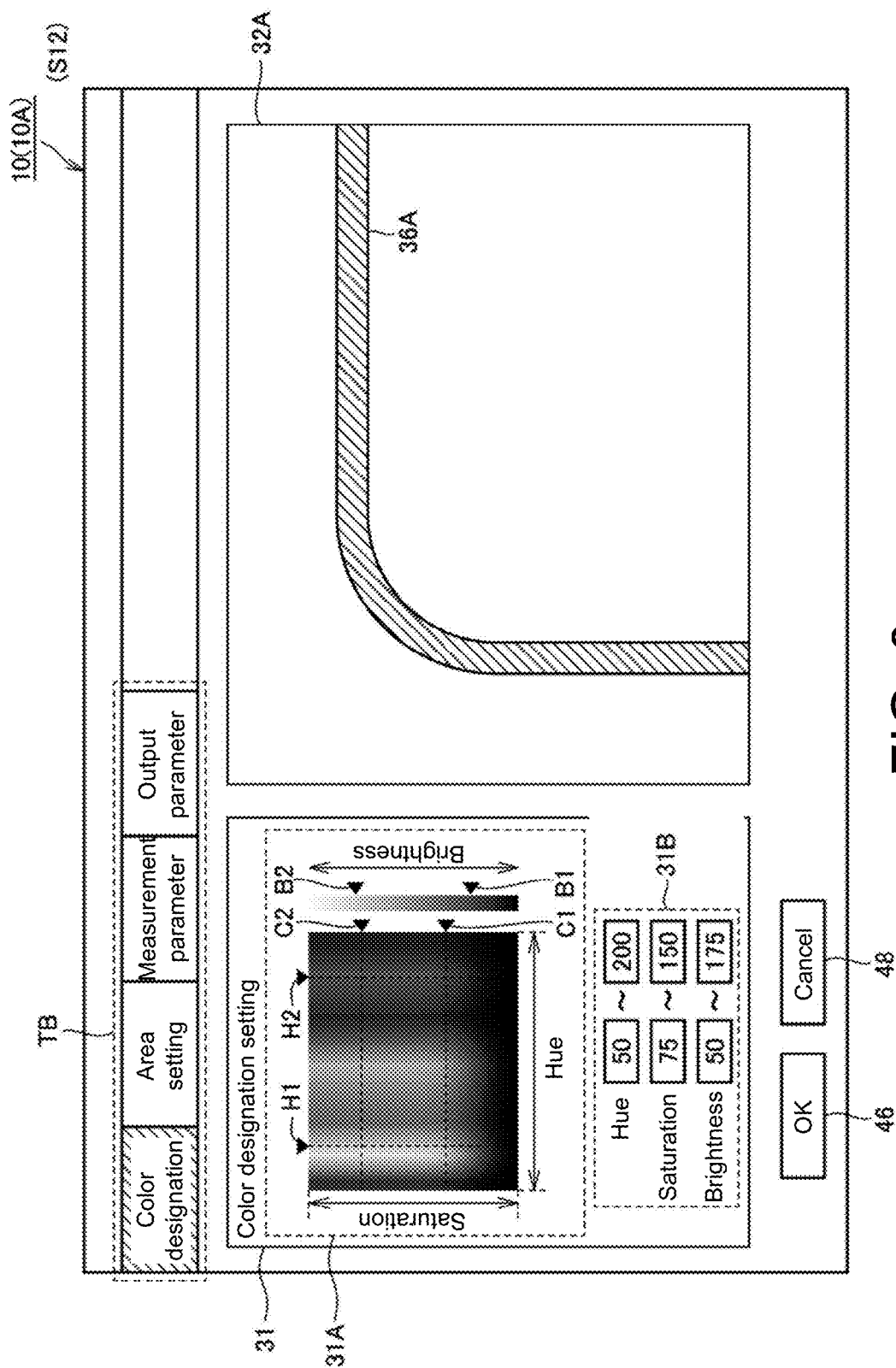
FIG. 6 is a diagram illustrating one example of a setting screen displayed in Step S12 illustrated in FIG. 5.

In Step S12, the control device 110 accepts color settings used for designating the range of colors of the coating material. FIG. 6 is a diagram illustrating one example of a setting screen 10 displayed in Step S12.

As illustrated in FIG. 6, the setting screen 10 includes a tab TB used for displaying various setting screens. When "color designation" of the tab TB is selected, a color setting screen 10A used for designating the range of colors of the coating material is displayed. The color setting screen 10A includes a color setting area 31, an image display area 32A, an OK button 46, and a cancel button 48.

In the color setting area 31, a user can input a setting of a hue range of the coating material, a setting of a saturation range of the coating material, and a setting of a lightness range of the coating material. Hereinafter, the hue range, the saturation range, and the lightness range will be collectively referred to as a "color range." The color setting area 31 includes a pointer designation area 31A in which a setting of the color range of the coating material is accepted through pointer designation and a numerical value input area 31B in which a setting of the color range of the coating material is accepted through a numeral value input.

The setting of the hue range of the coating material is set using a pointer H1 used for setting a lower limit value of the hue and a pointer H2 used for setting an upper limit value of the hue. The pointers H1 and H2 are configured to be slidable in the horizontal direction on the sheet face using a mouse operation or a touch operation. A range designated by the pointers H1 and H2 is set as the hue range of the coating material.

The setting of the saturation range of the coating material is set using a pointer C1 used for setting a lower limit value of the saturation and a pointer C2 used for setting an upper limit value of the saturation. The pointers C1 and C2 are configured to be slidable in the vertical direction on the sheet face using a mouse operation or a touch operation. A range designated by the pointers C1 and C2 is set as the saturation range of the coating material.

The setting of the lightness range of the coating material is set using a pointer B1 used for setting a lower limit value of the lightness and a pointer B2 used for setting an upper limit value of the lightness. The pointers B1 and B2 are configured to be slidable in the vertical direction on the sheet face using a mouse operation or a touch operation. A range designated by the pointers B1 and B2 is set as the lightness range of the coating material.

A user, in the numerical value input area 31B, can input the lower limit value of the hue, the upper limit value of the hue, the lower limit value of the saturation, the upper limit value of the saturation, the lower limit value of the lightness, and the upper limit value of the lightness as numerical values. Typically, positions of the pointers in the pointer designation area 31A and numerical values in the numerical value input area 31B are linked with each other.

The control device 110 binarizes the reference image in accordance with the color range designated in the color setting area 31. For example, when each pixel of the reference image is included in the color range designated in the color setting area 31, the control device 110 sets the value of these pixels as "1." On the other hand, when each pixel of the reference image is not included in the color range designated in the color setting area 31, the control device 110 sets the value of these pixels as "0." Accordingly, the control device 110 generates a binarized image from the reference image. The binarized image is displayed in the image display area 32A. In one embodiment, the control device 110 links the display of a binarized image displayed in the image display area 32A with the setting for the color setting area 31. A user can easily perform setting of the color range of a coating material by performing setting for the color setting area 31 while checking the binarized image.

When the user presses the OK button 46, the control device 110 stores the setting of the color range set in the color setting area 31 in the storage device 120 (see FIG. 4). On the other hand, when the user presses the cancel button 48, the control device 110 closes the display of the color setting screen 10A without storing the setting of the color range set in the color setting area 31.

Figure 7:
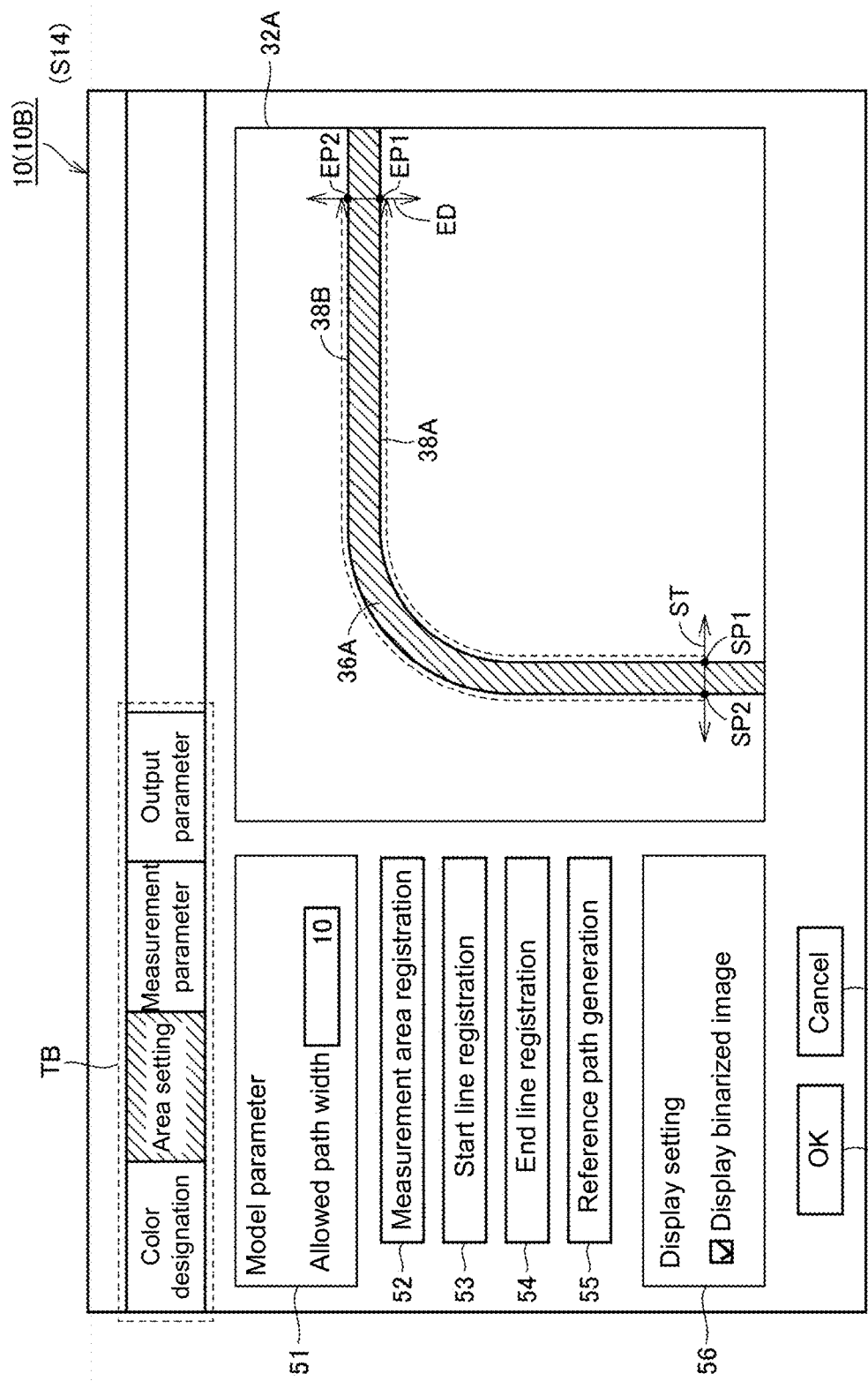
FIG. 7 is a diagram illustrating one example of a setting screen displayed in Step S14 illustrated in FIG. 5.

Referring back to FIG. 5, in Step S14, the control device 110 accepts a setting of a start position and an end position of a range to be coated with a coating material. FIG. 7 is a diagram illustrating one example of the setting screen 10 displayed in Step S14.

As illustrated in FIG. 7, when "area setting" of the tab TB is selected, an area setting screen 10B for designating a range to be coated with a coating material is displayed. The area setting screen 10B includes a width designation area 51, a measurement area registration button 52, a start line registration button 53, an end line registration button 54, a reference path generation button 55, a check box 56, an OK button 57, and a cancel button 58.

In the image display area 32A, the reference image acquired in Step S10 described above or a binarized image acquired from the reference image based on the color range set in Step S12 described above is displayed. The control device 110 performs sequential switching of a display of the reference image and the binarized image in accordance with an operation for the check box 56. More specifically, when "check" is not inserted into the check box 56, the control device 110 displays the reference image in the image display area 32A. On the other hand, when "check" is inserted into the check box 56, the control device 110 displays the binarized image in the image display area 32A.

In the width designation area 51, a user can set an allowed width of a path to be coated with the coating material in units of pixels. In the inspection process to be described later, when the coating material exceeds the allowed width, "NG" is acquired as results of the inspection.

The measurement area registration button 52 accepts registration of an image area to be inspected. More specifically, a user performs area designation for an image displayed in the image display area 32A. For example, the designation of the area is realized through a mouse operation, a touch operation, or the like. When the user presses the measurement area registration button 52 after the area designation, the control device 110 stores the designated inspection object area in the storage device 120 (see FIG. 4). Accordingly, an image area to be inspected and an image area not to be inspected are distinguished from each other.

The start line registration button 53 accepts registration of a start position of a range to be coated with a coating material. More specifically, a user can designate a start position of a coating area 36A for an image displayed in the image display area 32A. In the example illustrated in FIG. 7, a start line ST is set as the start position. The setting of the start line ST is, for example, realized through a mouse operation, a touch operation, or the like. The start line ST is set such that it traverses the coating area 36A. When the user presses the start line registration button 53 after the setting of the start line ST, the control device 110 stores the position (coordinate values) of the start line ST inside the image in the storage device 120 (see FIG. 4).

The end line registration button 54 accepts registration of an end position of a range to be coated with the coating material. More specifically, a user can designate an end position of the coating area 36A for the image displayed in the image display area 32A. In the example illustrated in FIG. 7, an end line ED is set as the end position. The setting of the end line ED is, for example, realized through a mouse operation, a touch operation, or the like. The end line ED is set such that it traverses the coating area 36A. When the user presses the end line registration button 54 after the setting of the end line ED, the control device 110 stores the position (coordinate values) of the end line ED inside the image in the storage device 120 (see FIG. 4).

The reference path generation button 55 is a button used for executing a process of automatically calculating a range to be coated with a coating material. The control device 110 executes the process of Step S16 illustrated in FIG. 5 based on reception of pressing of the reference path generation button 55.

More specifically, in Step S16, the control device 110 applies a differential filter for a binarized image acquired from the reference image based on the color range set in Step S12 described above, thereby generating a differential image representing an edge portion (gradient). For example, in the differential image, a pixel value of an edge portion is represented as "1," and a pixel value of a non-edge portion is represented as "0." The control device 110 detects two edge points (in other words, start points SP1 and SP2) of which pixel values are "1" on the start line ST and detects two edge points (end points EP1 and EP2) of which pixel values are "1" on the end line ED. The control device 110 searches for an edge point for pixels adjacent to the start point SP1 on the differential image in the counterclockwise direction. When an edge point is retrieved, the control device 110 stores coordinate values of the edge point and sets the edge point as a target pixel. Thereafter, the control device 110 searches for an edge point for pixels adjacent to the target pixel on the differential image in the counterclockwise direction. By repeating such a process, the control device 110 detects a group of coordinate values of edge points from the start point SP1 to the end point EP1 as an outline 38A. Similarly, the control device 110 detects a group of coordinate values of edge points from the start point SP2 to the end point EP2 as an outline 38B.

Figure 8:
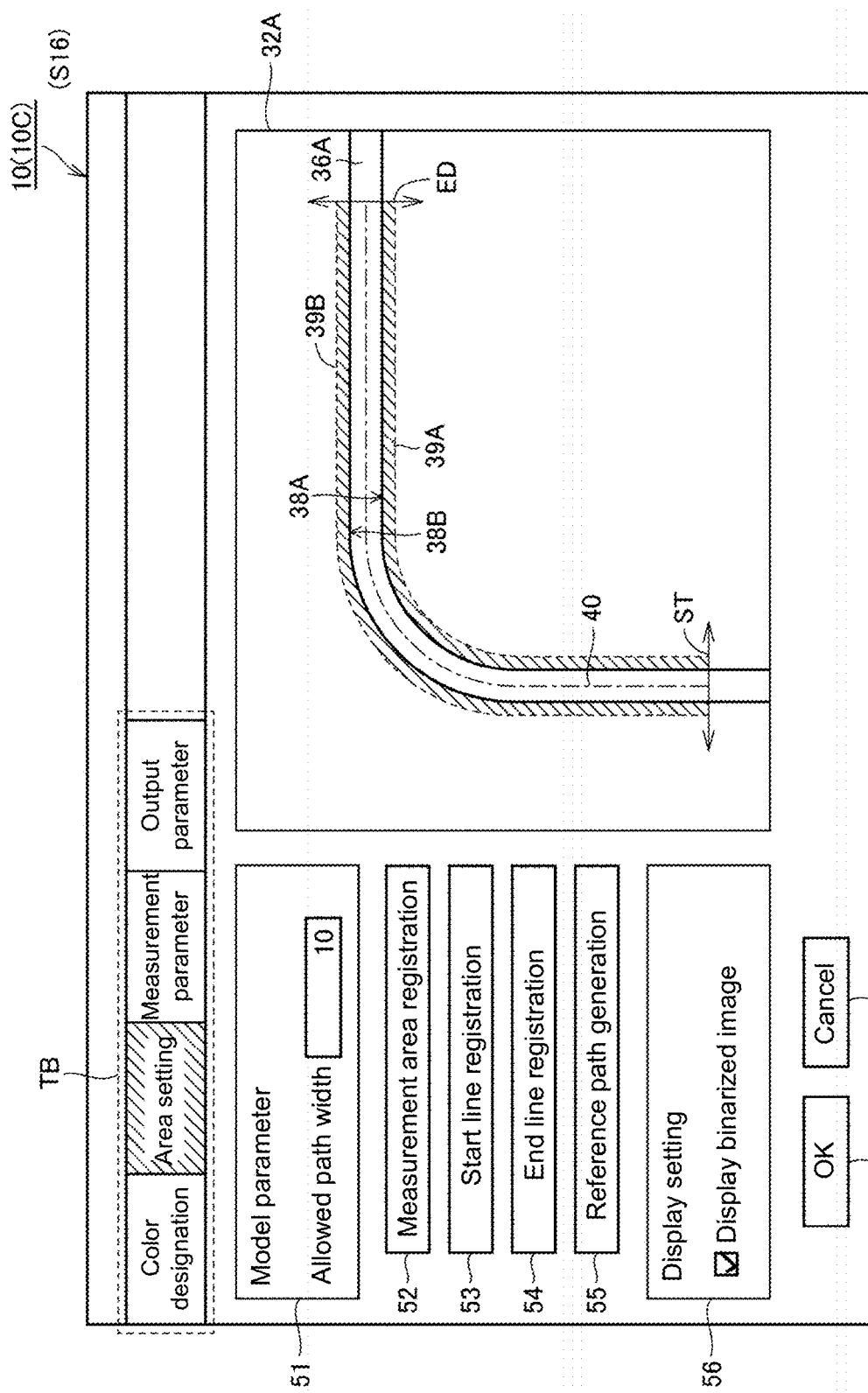
FIG. 8 is a diagram illustrating one example of a setting screen displayed after a reference path generation button is pressed.

FIG. 8 is a diagram illustrating one example of the setting screen 10 displayed after the reference path generation button 55 is pressed. As illustrated in FIG. 8, the control device 110 specifies allowed coating ranges 39A and 39B that are allowed as coating positions of the coating material based on the outlines 38A and 38B. Typically, the control device 110 extends ranges surrounded by the outlines 38A and 38B to the outer side by a width set in the width designation area 51 and specifies the ranges after the extension as allowed coating ranges 39A and 39B.

In addition, the control device 110 specifies a center line of the outlines 38A and 38B as a reference path 40 representing positions to be coated with the coating material. More specifically, the control device 110 specifies a corresponding point on the outline 38B for each point on the outline 38A. For example, the control device 110 specifies points on the outline 38B having shortest distances from points on the outline 38A as corresponding points. The control device 110 specifies a line connecting midpoints between the corresponding points on the outlines 38A and 38B as the reference path 40.

When the pressing of the OK button 57 is detected, the control device 110 executes the process of Step S18 illustrated in FIG. 5. More specifically, in Step S18, the control device 110 stores the allowed coating ranges 39A and 39B and the reference path 40 specified in Step S16 in the storage device 120 (see FIG. 4). When the pressing of the cancel button 58 is detected, the control device 110 closes the display of the area setting screen 10B without storing the allowed coating ranges 39A and 39B and the reference path 40.

[D2. Inspection Process]

Figure 9:
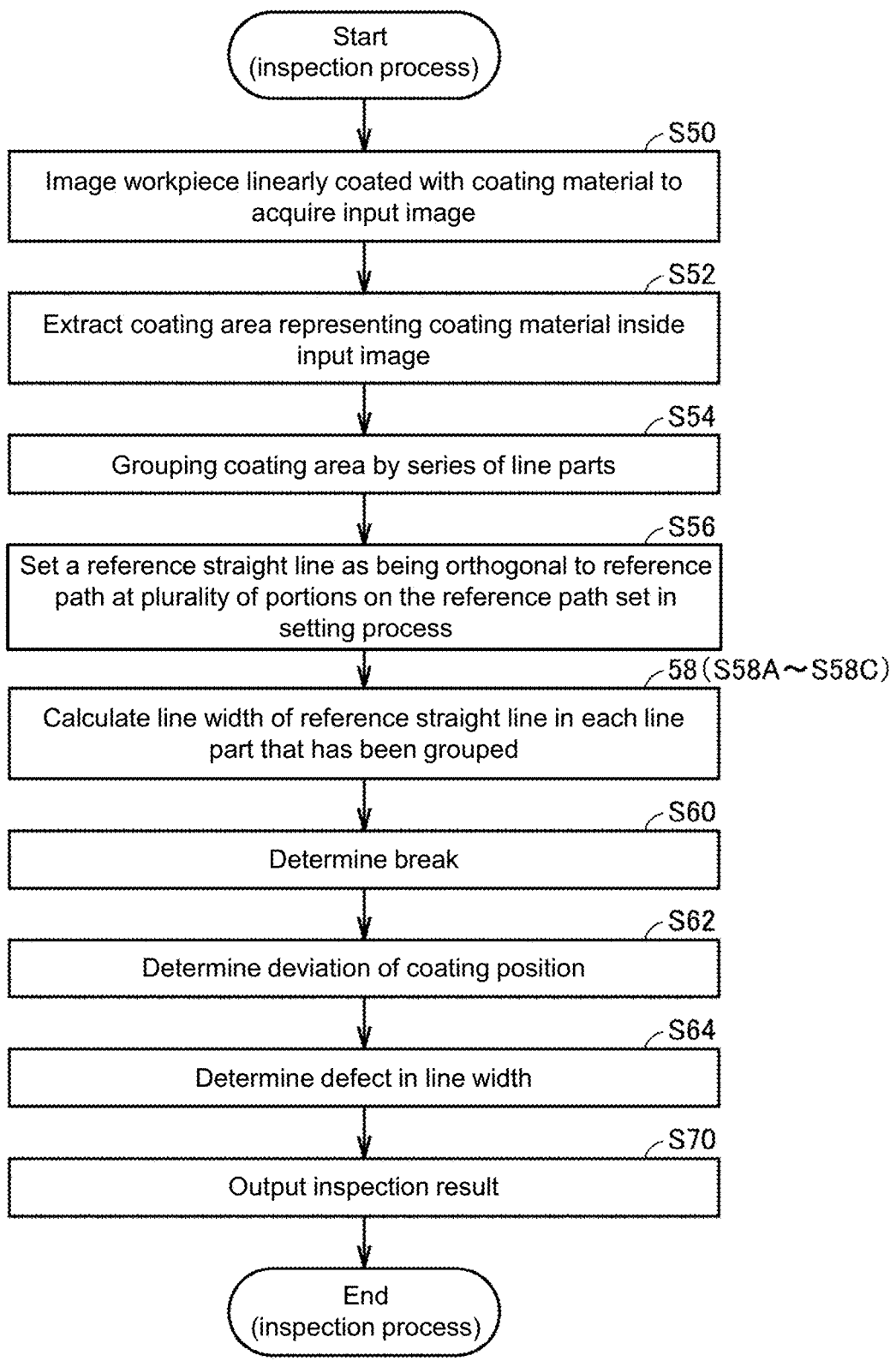
FIG. 9 is diagram illustrating a flowchart representing an inspection process executed by an image processing apparatus according to an embodiment.

Next, the inspection process executed by the control device 110 of the image processing apparatus 100 will be described with reference to FIGS. 9 to 18. FIG. 9 is diagram illustrating a flowchart representing the inspection process executed by the control device 110. The control device 110 performs an inspection of the coating quality of a coating material in accordance with various parameters set in the setting process described above.

Figure 10:
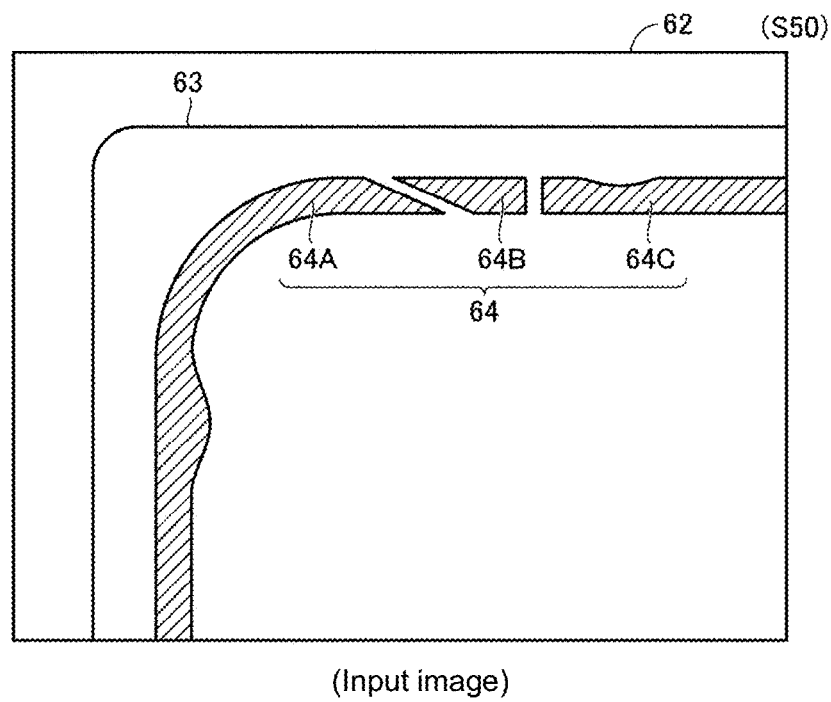
FIG. 10 is a diagram illustrating an input image acquired from an imaging unit.

More specifically, in Step S50, the control device 110 outputs an imaging instruction to the imaging unit 8 and causes the imaging unit 8 to image a workpiece linearly coated with a coating material. Accordingly, the control device 110 acquires an input image representing the workpiece coated with the coating material. FIG. 10 is a diagram illustrating an input image 62 acquired from the imaging unit 8. In the example illustrated in FIG. 10, the input image 62 includes a workpiece area 63 representing a workpiece and a coating area 64 representing a coating material. The coating area 64 is divided into linear parts 64A to 64C.

Figure 11:
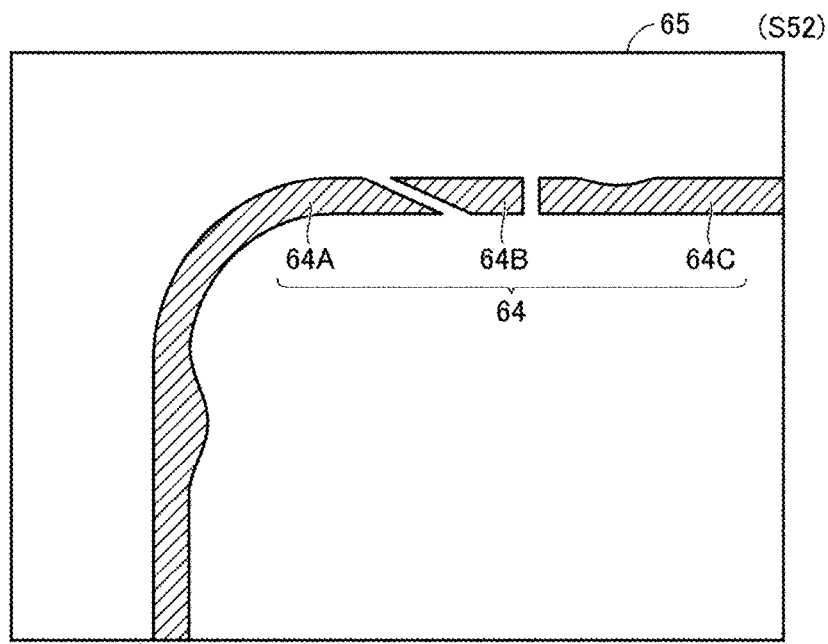
FIG. 11 is a diagram illustrating a binarized image acquired from an input image.

Referring back to FIG. 9, in Step S52, the control device 110 extracts the coating area 64 from the input image 62. More specifically, the control device 110 binarizes the input image in accordance with the color range of the coating material set in the setting process described above. For example, when each pixel of the input image is included in the set color range, the control device 110 sets the value of the pixel as "1." On the other hand, when each pixel of the input image is not included in the set color range, the control device 110 sets the value of the pixel as "0." In other words, pixels of which pixel values are "1" are extracted as a coating area representing the coating material. FIG. 11 is a diagram illustrating the binarized image 65 acquired from the input image 62. As illustrated in FIG. 11, in the binarized image 65, only the coating area 64 is extracted.

Referring back to FIG. 9, in Step S54, the control device 110 serving as the grouping unit 152 (see FIG. 1) described above groups the coating area 64 for each sequence of linear parts. For example, the control device 110 applies a differential filter to the binarized image 65, thereby generating a differential image representing an edge portion (gradient). In the differential image, a pixel value of an edge portion is represented as "1," and a pixel value of a non-edge portion is represented as "0." Thereafter, the control device 110 performs raster scanning of the differential image and searches for a pixels of which a pixel value is "1." When the pixel of which the pixel value is "1" is retrieved, the control device 110 sets the pixel as a start point. The control device 110 searches for edge points in the vicinity of the start point in the counterclockwise direction. When an edge point is retrieved, the control device 110 stores coordinate values of the edge point and sets the edge point as a target pixel. Thereafter, the control device 110 searches for an edge point for pixels adjacent to the target pixel on the differential image in the counterclockwise direction. The control device 110 executes such an outline tracking process until the target point is returned to the start point. The control device 110 detects a group of coordinate values stored in the process of outline tracking as an outline and specifies an area surrounded by the outline as one group.

At this time, in one embodiment, when the area of each group is smaller than a first threshold, the control device 110 regards the group as noise. On the other hand, when the area of each group is greater than a second threshold (>the first threshold), the control device 110 regards the group as noise. In other words, when the area of each group is equal to or greater than the first threshold and equal to or less than the second threshold, the control device 110 regards the group as a linear part.

Figure 12:
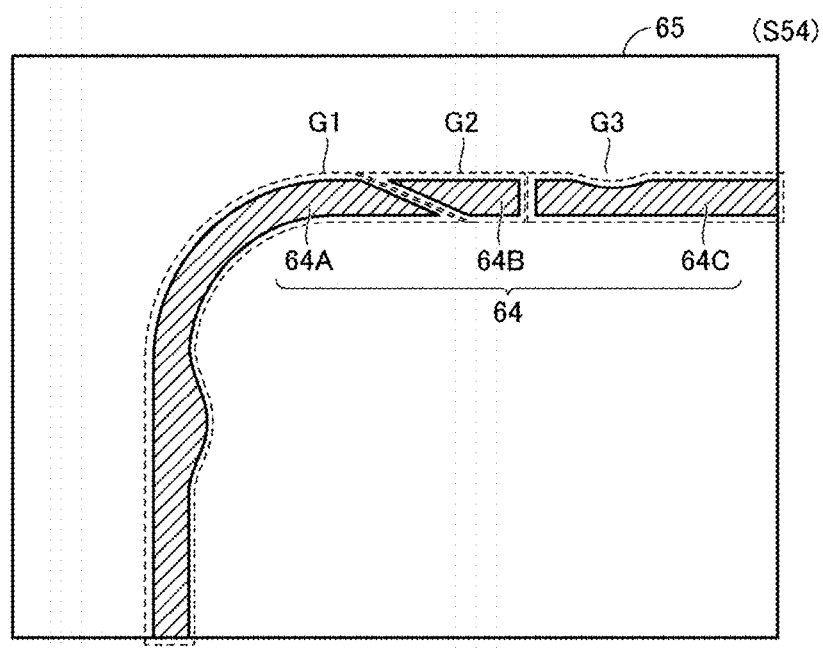
FIG. 12 is a diagram illustrating one example of results of grouping for a binarized image.

FIG. 12 is a diagram illustrating one example of results of grouping for the binarized image 65. In the example illustrated in FIG. 12, a linear part 64A of the coating area 64 is grouped as a group G1, a linear part 64B of the coating area 64 is grouped as a group G2, and a linear part 64C of the coating area 64 is grouped as a group G3.

Figure 13:
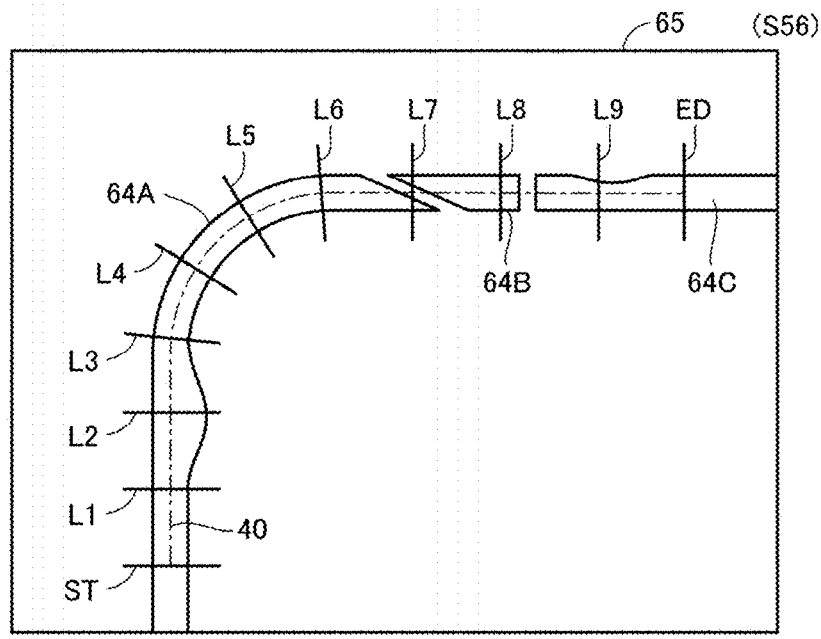
FIG. 13 is a diagram illustrating one example of a reference straight line set for a coating area.

Referring back to FIG. 9, in Step S56, the control device 110 serving as the calculation unit 154 (see FIG. 1) described above sets a reference straight line such that it is orthogonal to the tangential direction of the reference path 40 in a plurality of places on the reference path 40 (see FIG. 8) set in the setting process described above. FIG. 13 is a diagram illustrating one example of a reference straight line set for the coating area 64. In the example illustrated in FIG. 13, reference straight lines L1 to L9 are set.

Referring back to FIG. 9, in Step S58, for each of the linear parts 64A to 64C, the control device 110 serving as the calculation unit 154 (see FIG. 1) described above detects two edge points present on each of the reference straight lines L1 to L9 and calculates a distance between the two edge points as a line width. More specifically, the control device 110 applies a differential filter to the binarized image 65, thereby generating a differential image representing an edge portion (gradient). For example, in the differential image, a pixel value of an edge portion is represented as "1," and a pixel value of a non-edge portion is represented as "0." The control device 110 scans the reference straight lines L1 to L9 on the differential image and searches for at least two edge points of which pixel values are "1." The control device 110 calculates a distance between the two edge points as a line width. Typically, when three or more edge points are present, the control device 110 calculates a distance between two edge points present on the outermost side as a line width.

Figure 14:
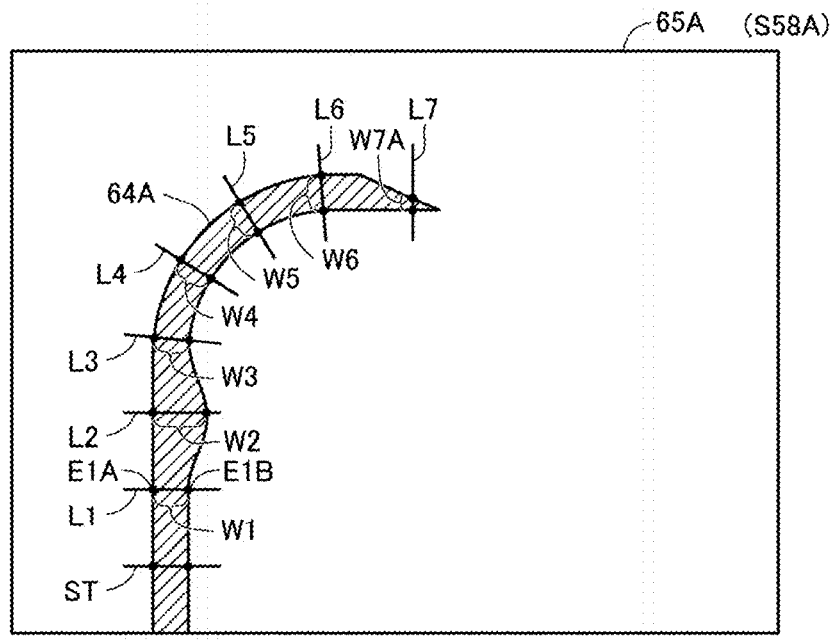
FIG. 14 is a diagram illustrating a line width calculating process for a first linear part.

The process of calculating a line width is performed for each grouped linear part. FIG. 14 is a diagram illustrating a line width calculating process for a linear part 64A. In FIG. 14, a binarized image 65A representing the linear part 64A is illustrated. In Step S58A, the control device 110 calculates a line width at places at which the linear part 64A and the reference straight lines L1 to L7 overlap each other. In the example illustrated in FIG. 14, the control device 110 detects edge points E1A and E1B on the reference straight line L1 and calculates a distance between the edge points E1A and E1B as a line width W1. Similarly, a line width W2 is calculated for the reference straight line L2. A line width W3 is calculated for the reference straight line L3. A line width W4 is calculated for the reference straight line L4. A line width W5 is calculated for the reference straight line L5. A line width W6 is calculated for the reference straight line L6. A line width W7A is calculated for the reference straight line L7.

Figure 15:
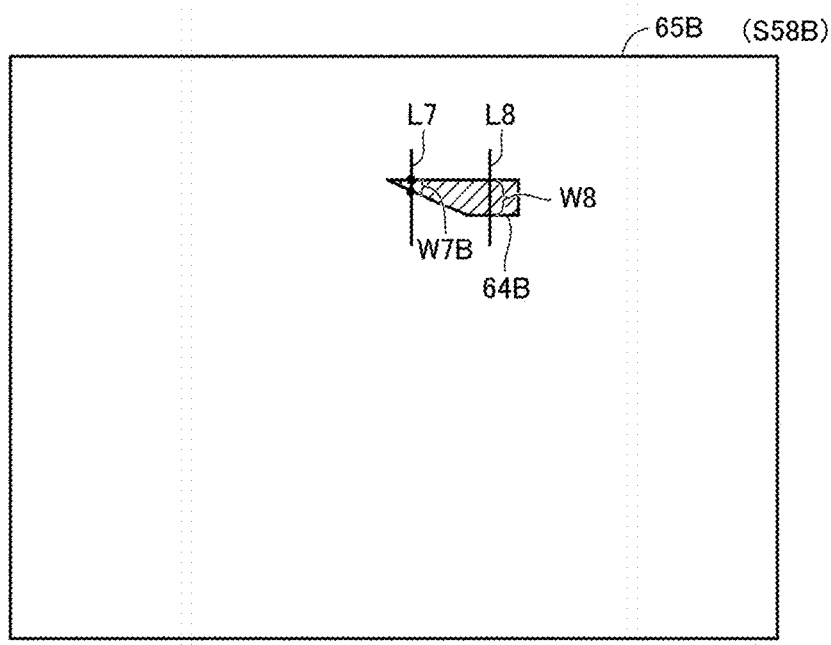
FIG. 15 is a diagram illustrating a line width calculating process for a second linear part.

FIG. 15 is a diagram illustrating a line width calculating process for a linear part 64B. In FIG. 15, a binarized image 65B representing the linear part 64B is illustrated. In Step S58B, the control device 110 calculates a line width at places at which the linear part 64B and the reference straight lines L7 and L8 overlap each other. In the example illustrated in FIG. 15, a line width W7B is calculated for the reference straight line L7. A line width W8 is calculated for the reference straight line L8.

Figure 16:
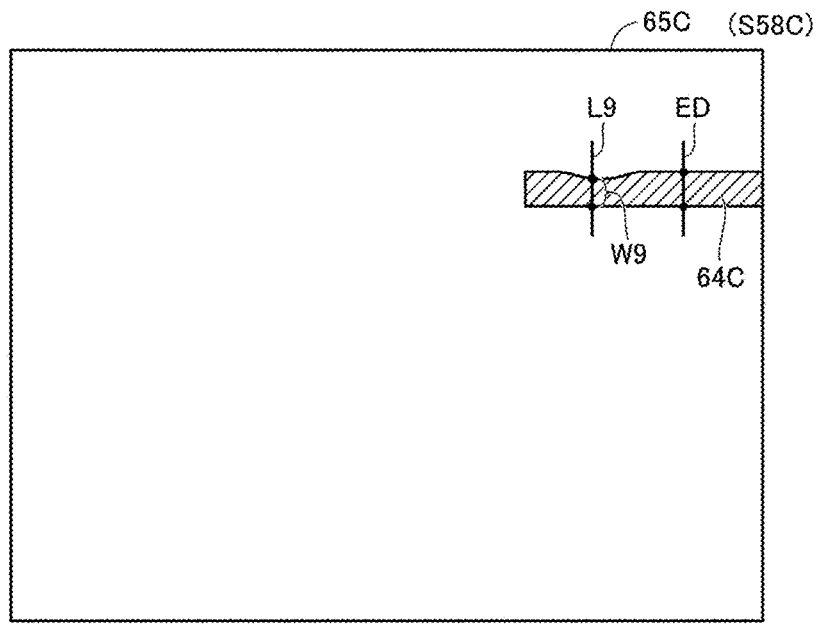
FIG. 16 is a diagram illustrating a line width calculating process for a third linear part.

FIG. 16 is a diagram illustrating a line width calculating process for a linear part 64C. In FIG. 16, a binarized image 65C representing the linear part 64C is illustrated. In Step S58C, the control device 110 calculates a line width at a place at which the linear part 64C and the reference straight line L9 overlap each other. In the example illustrated in FIG. 16, a line width W9 is calculated for the reference straight line L9.

Figure 17:
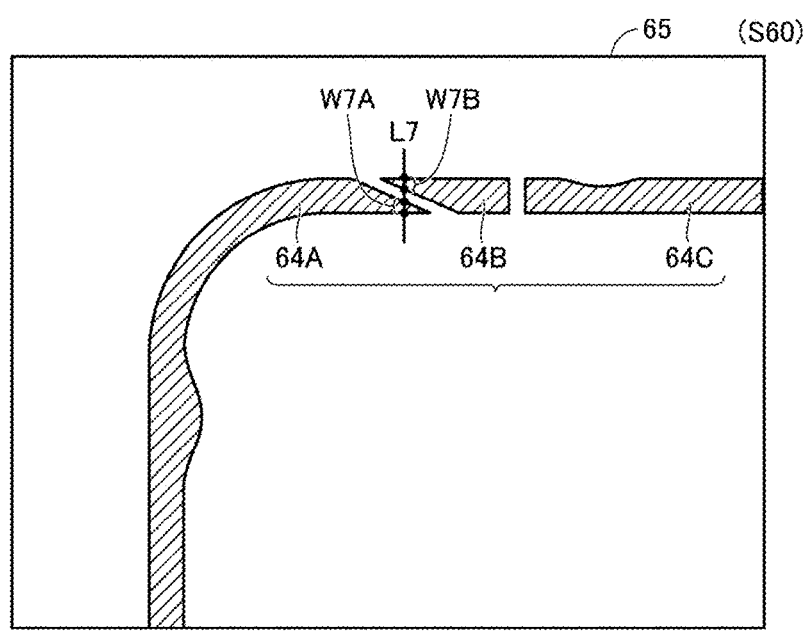
FIG. 17 is a diagram illustrating a break detecting process.

Referring back to FIG. 9, in Step S60, the control device 110 serving as the break detecting unit 156 (see FIG. 1) described above determines whether or not a break has occurred in the coating material based on the line widths calculated on the reference straight lines L1 to L9 and results of the grouping in Step S54. FIG. 17 is a diagram illustrating a break detecting process. As illustrated in FIG. 17, the control device 110 detects a break in the coating material when the number of groups acquired in Step S54 is two or more and detects an inclined break when a plurality of line widths are calculated for one of the reference straight lines L1 to L9. In the example illustrated in FIG. 17, since a plurality of line widths W7A and W7B are detected for one reference straight line L7, the control device 110 determines that an inclined break has occurred on the reference straight line L7. In addition, since the coating material is grouped into three groups in Step S54, the control device 110 determines that the coating material is divided into three parts.

A method of detecting an inclined break is not limited to the method described above, and any arbitrary method may be employed. For example, the control device 110 detects an inclined break when a line width calculated at an end portion of the linear parts 64A to 64C is equal to or less than a predetermined value. In the example illustrated in FIG. 17, when the line widths W7A and W7B are equal to or less than a predetermined value, the control device 110 determines that an inclined break has occurred on the reference straight line L7.

Referring back to FIG. 9, in Step S62, the control device 110 determines whether or not a deviation has occurred in a coating position of the coating material based on the allowed coating ranges 39A and 39B (see FIG. 8) set in the setting process described above. More specifically, the control device 110 executes an outline tracking process starting from the start line ST set in the setting process described above and detects the outline of the coating area 64. The outline tracking process is as described with reference to FIG. 7, and thus, description thereof will not be repeated here. When all the outlines of the coating area 64 are included in the allowed coating ranges 39A and 39B, the control device 110 determines that a deviation in the coating position of the coating material has not occurred. On the other hand, when some of outlines of the coating area 64 are not included in the allowed coating ranges 39A and 39B, the control device 110 determines that a deviation in the coating position of the coating material has occurred.

In Step S64, the control device 110 determines whether or not the line width of the coating material is within an allowed range. More specifically, when line widths calculated on the reference straight lines L1 to L9 (see FIG. 13) are below the lower limit value set in advance or when line widths calculated on the reference straight lines L1 to L9 are above the upper limit value set in advance, the control device 110 determines that that is a defect in the line width of the coating material. Otherwise, the control device 110 determines that there is no defect in the coating material.

Figure 18:
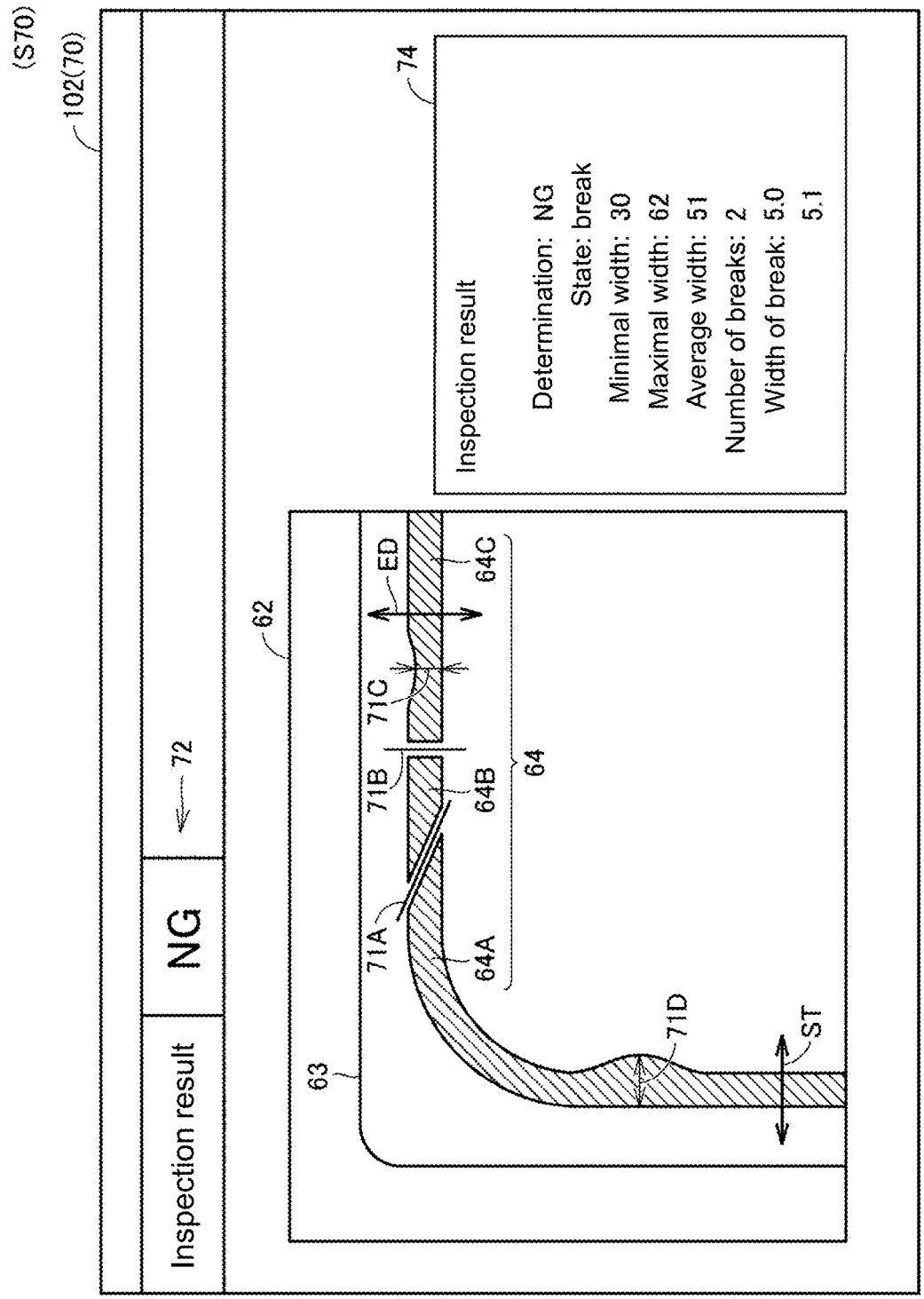
FIG. 18 is a diagram illustrating an example of display of inspection results when it is determined that there is a defect in the coating quality of a coating material.

In Step S70, the control device 110 causes the display unit 102 to display an inspection result. FIG. 18 is a diagram illustrating an example of display of an inspection result of a case in which it is determined that there is a defect in the coating quality of a coating material.

In FIG. 18, an inspection result screen 70 is illustrated. The inspection result screen 70 includes an input image 62, an overview display area 72 of the inspection result and a detailed display area 74 of the inspection result.

The control device 110 displays defective portions on the input image 62. For example, the control device 110 displays portions in which an inclined break has occurred on the input image 62 in an emphasized manner compared with the other portions. Accordingly, the user can acquire a portion in which an inclined break has occurred at a glance.

A method of emphasizing a portion in which an inclined break has occurred is arbitrary. In an embodiment, the display unit 102 displays a straight line along an inclined break for displaying the portion in which an inclined break has occurred in an emphasized manner. In the example illustrated in FIG. 18, a straight line 71A is displayed in a portion in which an inclined break has occurred. Accordingly, a user can easily acquire a direction in which inclined breaks have occurred. In another embodiment, the display unit 102 displays each portion in which an inclined break has occurred in a color different from that of the other portions.

In addition, the display unit 102 displays a portion in which a coating material is broken in an orthogonal direction in an emphasized manner compared with the other portions. In the example illustrated in FIG. 18, a straight line 71B is displayed in a portion in which a coating material is broken in the orthogonal direction.

In addition, the display unit 102 displays a portion in which the line width of the coating material is minimal in an emphasized manner compared with the other portions. In the example illustrated in FIG. 18, a mark 71C is displayed in a portion in which the line width is minimal. Accordingly, the user can easily perceive a portion in which the line width is the minimal.

In addition, the display unit 102 displays a portion in which the line width of the coating material is maximal in an emphasized manner compared with the other portions. In the example illustrated in FIG. 18, a mark 71D is displayed in a portion in which the line width is the maximal. Accordingly, the user can easily perceive a portion in which the line width is the maximum.

In the overview display area 72, an overview of the inspection result is displayed. For example, in the overview display area 72, it is displayed whether or not the inspection result is good. When the coating quality of the coating material is good, "OK" is displayed in the overview display area 72. On the other hand, when there is a defect in the coating quality of the coating material, "NG" is displayed in the overview display area 72. The inspection result displayed in the overview display area 72 is displayed as being larger than the inspection result displayed in the detailed display area 74. It is difficult for a user to overlook a defective product of the workpiece W by checking the inspection result displayed in the overview display area 72.

In the detailed display area 74, details of the inspection result are displayed. For example, in the detailed display area 74, whether or not an inspection result is good, the state of an inspection object, a minimal coating width of the coating material, a maximal coating width of the coating material, an average coating width of the coating material, the number of breaks of the coating material, and the break width of the coating material are displayed.

More specifically, the control device 110 specifies a minimal coating width from among line widths calculated on the reference straight lines L1 to L9 (see FIG. 13) and displays the minimal coating width in the detailed display area 74. The control device 110 specifies a maximum coating width from among line widths calculated on the reference straight lines L1 to L9 and displays the maximal coating width in the detailed display area 74. In addition, the control device 110 specifies an average coating width of line widths calculated on the reference straight lines L1 to L9 and displays the average coating width in the detailed display area 74. Furthermore, the control device 110 displays the number of groups in which the coating areas 64 are grouped by the grouping unit 152 described above as the number of breaks of the coating material in the detailed display area 74. In addition, the control device 110 calculates a gap between linear parts adjacent to each other as a break width and displays the break width in the detailed display area 74.

E. Summary

As described above, the image processing apparatus 100 groups the coating area 64 for each sequence of linear parts and calculates a line width in the orthogonal direction of the linear part for each grouped linear part in a plurality of portions of the coating area 64. Thereafter, the image processing apparatus 100 detects an inclined break in the coating area 64 based on the calculated line width for each linear part. By calculating the line width for each sequence of linear parts that are grouped, the image processing apparatus 100 can detect a break also when the coating material is broken into three or more parts.

F. Supplement

As described above, this embodiment includes the following disclosure.
[Configuration 1]
An image processing apparatus includes: a grouping unit (152) that is used for extracting coating areas representing a coating material from an input image (30) acquired by imaging an inspection object linearly coated with the coating material and grouping the coating areas for each sequence of linear parts; a calculation unit (154) that is used for calculating a line width in an orthogonal direction of a linear part for each of the linear parts in a plurality of portions of the coating area including end portions of the linear parts; a break detecting unit (156) that is used for detecting a break in the coating material based on the line widths calculated in the plurality of portions; and an output unit (101) that is used for outputting an indication representing occurrence of the break when the break is detected.
[Configuration 2]
The image processing apparatus according to Configuration 1, wherein the output unit (101) displays the input image (30) and displays a portion in which the break has occurred on the input image (30) in an emphasized manner compared with other portions.
[Configuration 3]
The image processing apparatus according to Configuration 2, wherein the emphasized displaying includes displaying a straight line along the break.
[Configuration 4]
The image processing apparatus according to any one of Configurations 1 to 3, wherein the output unit (101) further displays a number of groups into which the coating area is grouped by the grouping unit (152) as a number of breaks of the coating material.
[Configuration 5]
The image processing apparatus according to any one of Configurations 1 to 4, wherein the calculation unit (154) sets straight lines in a plurality of portions of a predetermined reference path such that the straight lines are orthogonal to the reference path representing positions at which the coating material is to be shown in an image, detects two edge points presented on each of the set straight lines for each of the linear parts and calculates a distance between the two edge points as the line width.
[Configuration 6]
The image processing apparatus according to Configuration 5, wherein, when a plurality of line widths are calculated for one of the straight lines set in the plurality of portions, the break detecting unit (156) detects the break.
[Configuration 7]
An image processing method including: a step (S54) of extracting coating areas representing a coating material from an input image (30) acquired by imaging an inspection object linearly coated with the coating material and grouping the coating areas for each sequence of linear parts; a step (S58) of calculating a line width in an orthogonal direction of a linear part for each of the linear parts in a plurality of portions of the coating area including end portions of the linear parts; a step (S60) of detecting a break in the coating material based on the line widths calculated in the plurality of portions; and a step (S70) of outputting an indication representing occurrence of the break when the break is detected.
[Configuration 8]
A non-transitory computer readable recording medium that recording an image processing program executed by a computer, the image processing program causing the computer to execute: a step (S54) of extracting coating areas representing a coating material from an input image (30) acquired by imaging an inspection object linearly coated with the coating material and grouping the coating areas for each sequence of linear parts; a step (S58) of calculating a line width in an orthogonal direction of a linear part for each of the linear parts in a plurality of portions of the coating area including end portions of the linear parts; a step (S60) of detecting a break in the coating material based on the line widths calculated in the plurality of portions; and a step (S70) of outputting an indication representing occurrence of the break when the break is detected.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. An image processing apparatus, comprising:
a processor, configured to:
extract coating areas representing a coating material from an input image acquired by imaging an inspection object linearly coated with the coating material and groups the coating areas for each sequence of linear parts;
calculate a line width in an orthogonal direction of the linear part for each of the linear parts in a plurality of portions of the coating area including end portions of the linear parts;
detect a break in the coating material based on the line widths calculated in the plurality of portions; and
output an indication representing occurrence of a break when the break is detected, wherein
the processor displays the input image and displays a portion in which the break has occurred on the input image in an emphasized manner compared with other portions.
2. The image processing apparatus according to claim 1, wherein the emphasized displaying includes displaying a straight line along the break.
3. The image processing apparatus according to claim 2, wherein the processor further displays a number of groups into which the coating area is grouped by the grouping unit as a number of breaks of the coating material.
4. The image processing apparatus according to claim 3, wherein the processor sets straight lines in a plurality of portions of a predetermined reference path such that the straight lines are orthogonal to the reference path representing positions at which the coating material is to be shown in an image and detects two edge points presented on each of the set straight lines for each of the linear parts and calculates a distance between the two edge points as the line width.
5. The image processing apparatus according to claim 4, wherein, when a plurality of line widths are calculated for one of the straight lines set in the plurality of portions, the processor detects the break.

6. The image processing apparatus according to claim 2, wherein the processor sets straight lines in a plurality of portions of a predetermined reference path such that the straight lines are orthogonal to the reference path representing positions at which the coating material is to be shown in an image and detects two edge points presented on each of the set straight lines for each of the linear parts and calculates a distance between the two edge points as the line width.

7. The image processing apparatus according to claim 6, wherein, when a plurality of line widths are calculated for one of the straight lines set in the plurality of portions, the processor detects the break.

8. The image processing apparatus according to claim 1, wherein the processor further displays a number of groups into which the coating area is grouped as a number of breaks of the coating material.

9. The image processing apparatus according to claim 8, wherein the processor sets straight lines in a plurality of portions of a predetermined reference path such that the straight lines are orthogonal to the reference path representing positions at which the coating material is to be shown in an image and detects two edge points presented on each of the set straight lines for each of the linear parts and calculates a distance between the two edge points as the line width.

10. The image processing apparatus according to claim 9, wherein, when a plurality of line widths are calculated for one of the straight lines set in the plurality of portions, the processor detects the break.

11. The image processing apparatus according to claim 1, wherein the processor sets straight lines in a plurality of portions of a predetermined reference path such that the straight lines are orthogonal to the reference path representing positions at which the coating material is to be shown in an image and detects two edge points presented on each of the set straight lines for each of the linear parts and calculates a distance between the two edge points as the line width.

12. The image processing apparatus according to claim 11, wherein, when a plurality of line widths are calculated for one of the straight lines set in the plurality of portions, processor detects the break.

13. An image processing method, comprising:
extracting coating areas representing a coating material from an input image acquired by imaging an inspection object linearly coated with the coating material and grouping the coating areas for each sequence of linear parts;
calculating a line width in an orthogonal direction of the linear part for each of the linear parts in a plurality of portions of the coating area including end portions of the linear parts;
detecting a break in the coating material based on the line widths calculated in the plurality of portions; and
outputting an indication representing occurrence of the break when the break is detected, wherein the outputting comprises:
displaying the input image and displaying a portion in which the break has occurred on the input image in an emphasized manner compared with other portion.

14. A non-transitory computer readable recording medium recording an image processing program executed by a computer, the image processing program causing the computer to execute:
extracting coating areas representing a coating material from an input image acquired by imaging an inspection object linearly coated with the coating material and grouping the coating areas for each sequence of linear parts;
calculating a line width in an orthogonal direction of the linear part for each of the linear parts in a plurality of portions of the coating area including end portions of the linear parts;
detecting a break in the coating material based on the line widths calculated in the plurality of portions; and
outputting an indication representing occurrence of the break when the break is detected, wherein the outputting comprises:
displaying the input image and displaying a portion in which the break has occurred on the input image in an emphasized manner compared with other portion.

* * * * *